Aug. 29, 1933.   F. N. ROSS ET AL   1,924,258
METHOD OF AND MACHINE FOR MANUFACTURING UPHOLSTERY
Filed June 21, 1932   7 Sheets-Sheet 1

Fig. 2

Aug. 29, 1933.   F. N. ROSS ET AL   1,924,258
METHOD OF AND MACHINE FOR MANUFACTURING UPHOLSTERY
Filed June 21, 1932   7 Sheets-Sheet 4

INVENTORS:
Frederick N. Ross
Horace L. Johnson
By Macleod, Calver, Copeland & Dike
Attys.

Aug. 29, 1933. F. N. ROSS ET AL 1,924,258
METHOD OF AND MACHINE FOR MANUFACTURING UPHOLSTERY
Filed June 21, 1932 7 Sheets-Sheet 5

Aug. 29, 1933.   F. N. ROSS ET AL   1,924,258
METHOD OF AND MACHINE FOR MANUFACTURING UPHOLSTERY
Filed June 21, 1932   7 Sheets-Sheet 7

Fig_16_

Fig_17

Fig_18_

Fig_19_

Fig_20_

INVENTORS:
Frederick N. Ross
Horace L. Johnson
by MacLeod, Calver, Copeland & Dike
Attys.

Patented Aug. 29, 1933

1,924,258

UNITED STATES PATENT OFFICE 1,924,258

METHOD OF AND MACHINE FOR MANUFACTURING UPHOLSTERY

Frederick N. Ross, Grosse Pointe Park, and Horace L. Johnson, Detroit, Mich., assignors to Briggs Manufacturing Company, Detroit, Mich., a Corporation of Michigan Application June 21, 1932. Serial No. 618,507

18 Claims. (Cl. 45—138)

This invention relates to the manufacture of upholstery cushions of the type employed in automobile seats and the like. More particularly, the invention is directed to the removal of part of the stuffing from the edges of upholstery cushions cut from a strip of upholstery, such as is produced in machines of the type described in a co-pending application, Serial No. 515,333, filed Feb. 12, 1931.

The removal of part of the stuffing from the edges of upholstery cushions has been necessary in order to facilitate folding the edges around the corners and edges of the seats and securing the edges of the cushions to the seats. The stuffing has been partially removed from the edges of the upholstery cushions by pulling it out by hand. This has involved considerable labor and has been expensive.

It is an object of the present invention to overcome this difficulty by the provision of a method of and reliable machine for removing a desired portion of the stuffing from the edges of upholstery cushions.

The invention will be more clearly understood from the following description in conjunction with the accompanying drawings: in which.

Before explaining in detail the present invention, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

Figures 1, 21, 22:
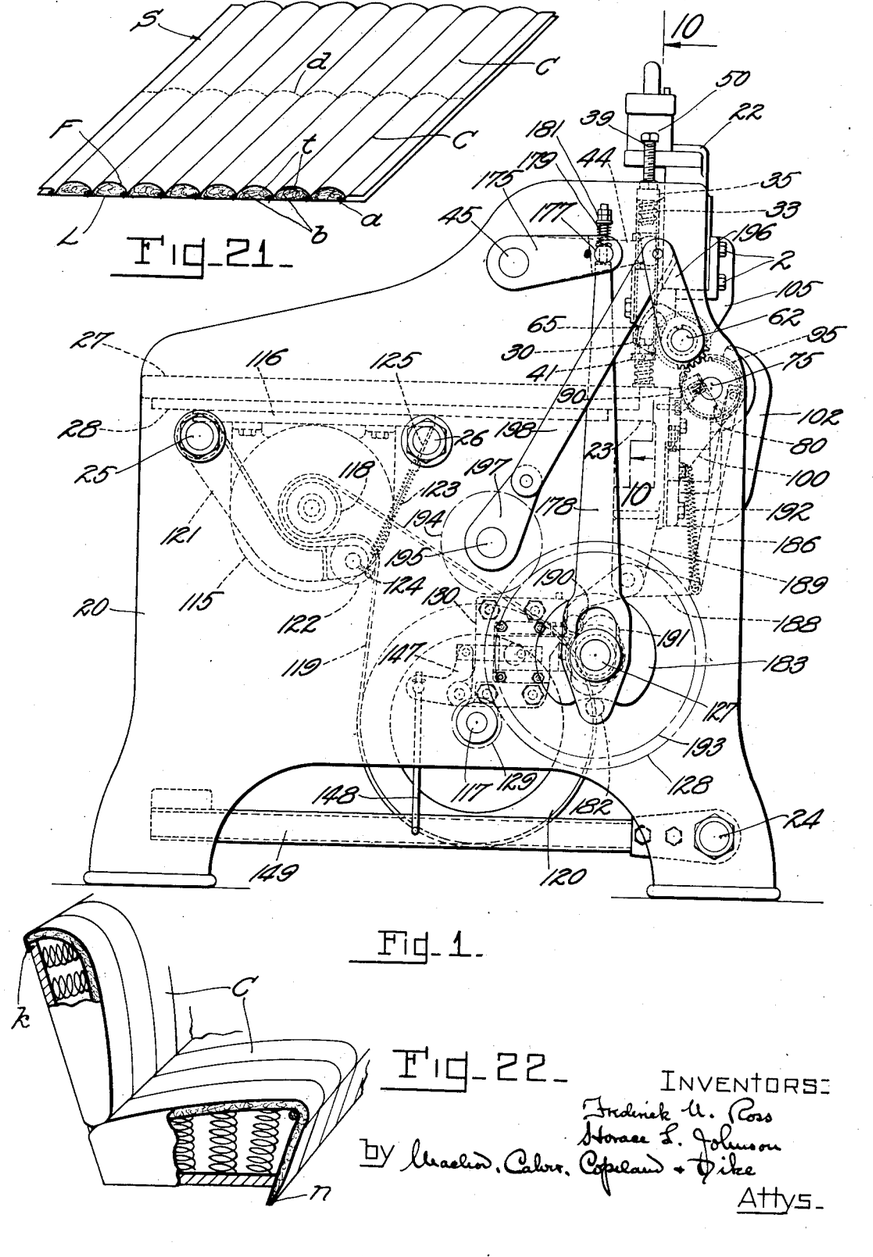
Fig. 1 is an end elevational view of the machine embodying the invention.
Fig. 21 is a perspective view of a strip of one type of upholstery upon which the machine embodying the invention operates.
Fig. 22 is a fragmentary perspective view partly in section of an automobile seat illustrating the application of the upholstery after a portion of the stuffing has been removed from the edges in accordance with the invention.

In Fig. 21 of the accompanying drawings, a strip S of upholstery is shown of the type produced by machines of the character described in the above mentioned co-pending application. The strip S is illustrative of one type of upholstery contemplated by the invention. This upholstery comprises a finish fabric F and a lining fabric L. The finish fabric is formed into a plurality of longitudinally extending tubes $t$ which are filled with stuffing, such as strips of cotton bat $b$ and covered by the lining fabric which is secured to the finish fabric by lines of stitching $a$ passing through each of the fabrics and completed within the tubes.

The strip S is produced so that its width corresponds to the desired width of the upholstery cushions and is cut transversely along lines $d$ into cushions C of the desired length. The present invention contemplates removing a part of the stuffing from the edges of the cushion, preferably, by pushing it out the open ends of the tubes and then cutting this part at the edge of the cushion. Fig. 22 shows cushions C secured to an automobile seat and seat back. The lower edge of the seat cushion has not been secured and illustrates the reduced edge portion $n$ formed by removing a part of the stuffing therefrom. The upper edge of the other cushion is secured to the seat back by tacks $k$ and illustrates the neat and smooth finish resulting from the removal of a part of the stuffing from the edge of the cushion.

A machine illustrating one embodiment of the invention is shown in the accompanying drawings and comprises a frame having side members 20 and 21 connected by a top cross head 22 and a lower cross head 23. The lower rear portions of the side members 20 and 21 are connected by a frame member 24 and the front upper and intermediate portions of said side members are connected by frame members 25 and 26 respectively. A table 27 over which the work is fed to the machine is secured at its rear end to and flush with the top of the lower cross head 23 and at its forward end upon lugs 28 extending inwardly from the forward portion of the side frame members 20 and 21.

Figure 2:
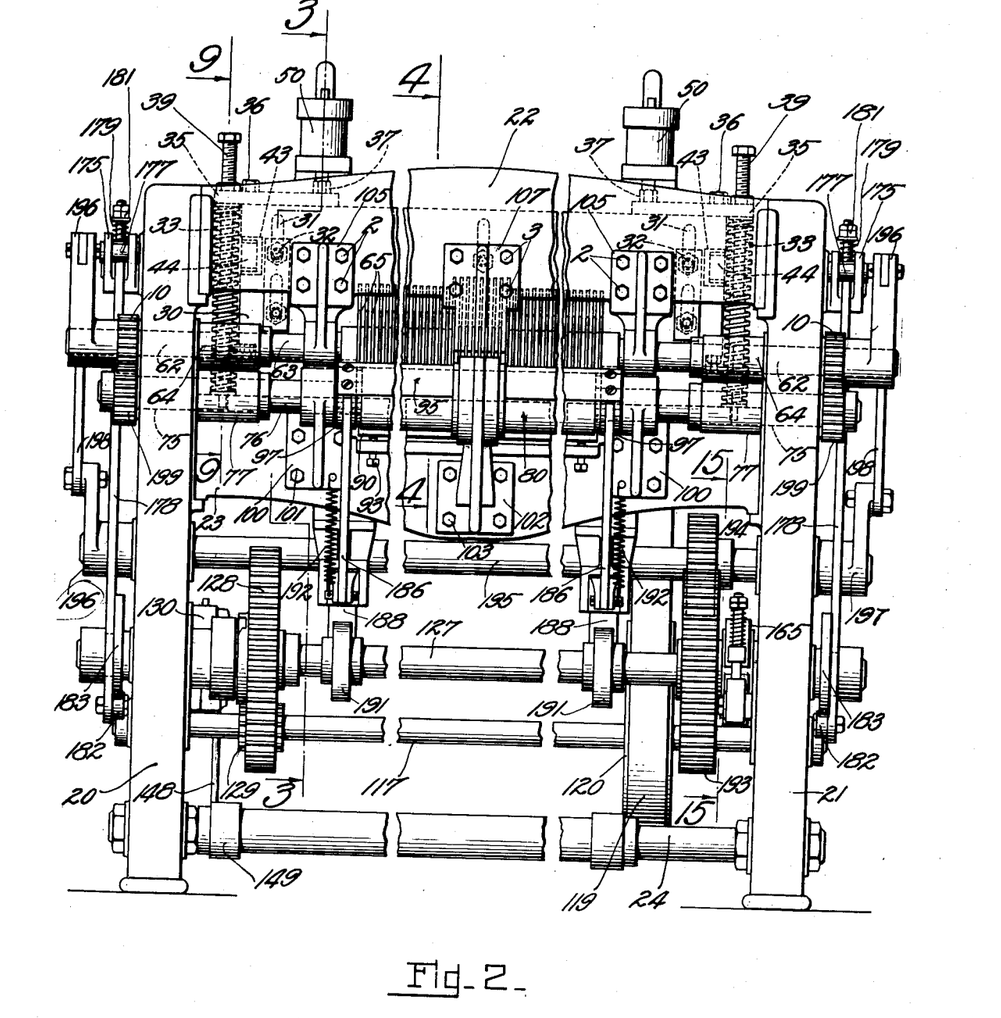
Fig. 2 is an elevational view of the same as viewed from the right of Fig. 1.
Figure 3:
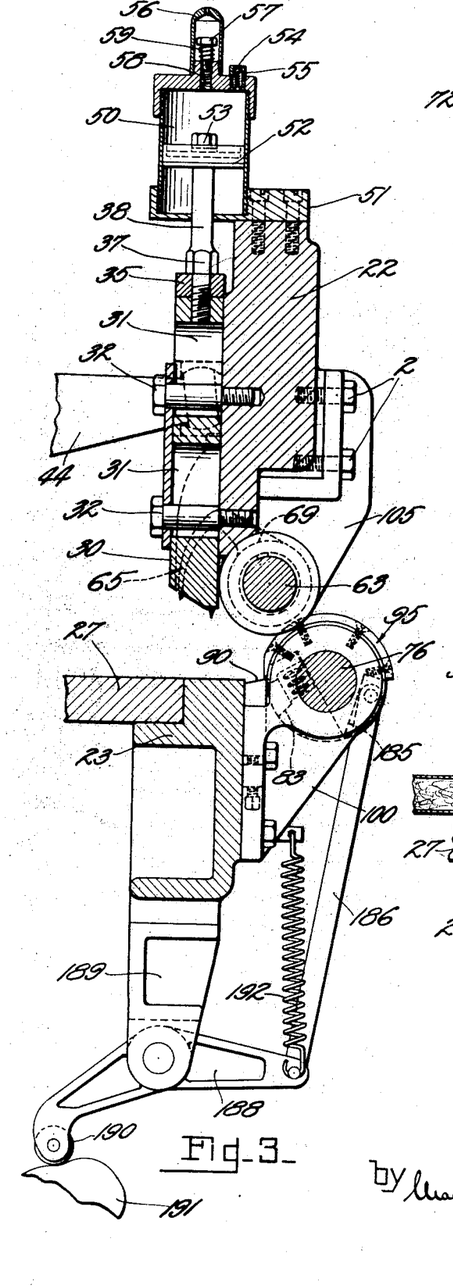
Figs. 3 and 4 are sectional views taken upon the lines 3—3 and 4—4 respectively of Fig. 2.
Figure 10:
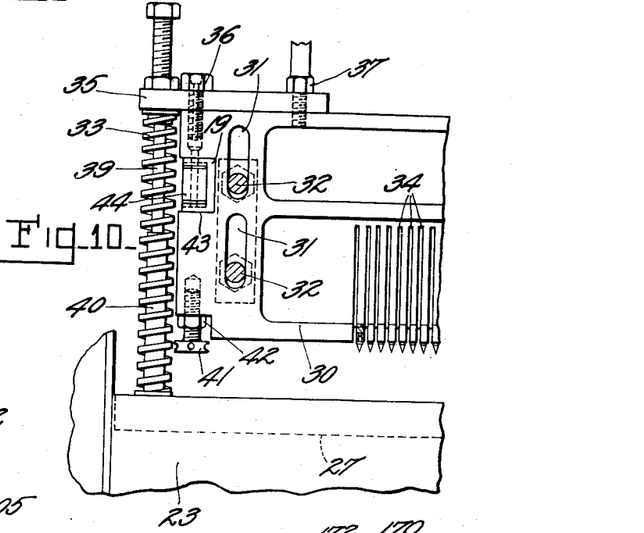
Fig. 10 is a sectional view taken substantially on the line 10—10 of Fig. 1.

A presser foot 30 is slidably mounted upon the front vertical face of the top cross head 22 for movement toward and from the table 27 and is provided with guide slots 31 adapted to receive guide bolts 32 extending therethrough and secured to the cross head 22 (see particularly Figs. 2, 3 and 10). Slots 34 in the presser foot extend between the lower and rear portions thereof to permit passage of a plurality of arms 65 described hereinafter. The presser foot 30 normally is held away from the table 27 by springs 33 one of which is located at each end of the presser foot extending between the top of the lower cross head 23 and an arm 35 extending from the side of the presser foot and secured thereto by a bolt 36 and a bolt 37 formed as part of the lower end of a piston rod 38. Each of the springs 33 surrounds a pair of telescoping members 39 and 40 at each end of the presser foot secured in the arm 35 and the top of the lower cross head 23 respectively. The downward movement of the presser foot 30 is limited by adjustable stops 41 threaded in the presser foot at each end thereof and adapted to engage the top surface of the lower cross head 23. Each adjustable stop 41 is locked in its adjusted position by a lock nut 42 (see Fig. 10). The presser foot 30 is provided with a pair of recesses 43 each adapted to support a socket member 19 for the reception of the free end of one of the crank arms 44 secured in spaced relation upon a shaft 45 extending through and rotatably mounted in suitable bearings in the side frames 20 and 21.

Each of the piston rods 38 extends into one of a pair of cylinders 50 carried by spaced brackets 51 suitably secured upon the top cross head 22. Pistons 52 movable within the cylinders 50 are secured upon the piston rods 38 by nuts 53. The head of each cylinder 50 is provided with an opening 54 adapted to be closed by a spring-pressed check valve 55. An exhaust valve is also provided in the head of each cylinder 50 and is enclosed in an apertured casing 56. As illustrated, each exhaust valve comprises a bolt 57 threaded in a passage through the head of the cylinder and provided with a tapered longitudinally extending slot 58. A spring 59 extends between the head of the bolt 57 and the head of the cylinder to hold the exhaust valve in a desired adjusted position.

Figure 11:
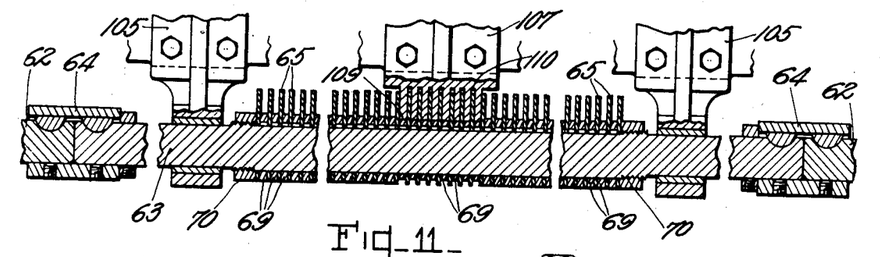
Fig. 11 is a fragmentary elevational view partly in section of a portion of the machine.
Figure 23:
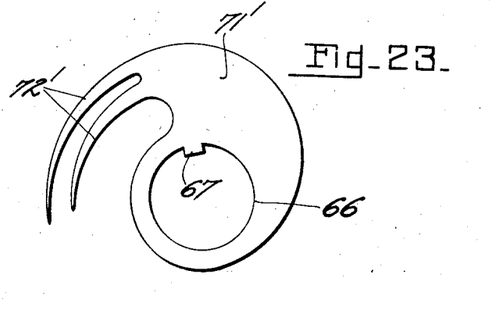
Fig. 23 is a detail view of a modified form of one of the parts of the machine.

Alined stub shafts 62 are mounted for rotation in suitable bearings in the side frames 20 and 21. A shaft 63 is alined with and operatively connected to the stub shafts 62 by collars 64 overlapping the ends of the shafts and keyed thereto (see particularly Figs. 2 and 11). The plurality of arms 65, which operate in the slots 34 in the presser foot 30 previously referred to, are mounted in spaced relation upon the shaft 63 and each is provided with an opening 66 providing a bearing surrounding the shaft 63 and providing a key 67 engaging a key-way 68 in said shaft (see particularly Fig. 4). A spacer ring 69 is positioned between each of the arms 65 (Fig. 11) to hold the latter in desired spaced relation. Collars 70 threaded on the shaft 63 engage the outer arms 65 and prevent axial movement thereof. Preferably, each of the arms 65 is provided with a portion 71 extending laterally from the shaft 63 and terminating in a curved finger 72 substantially concentric with the shaft 63 and extending from the end of the portion 71 in a counterclockwise direction as viewed in Figs. 1 and 3 to 8. In Fig. 23 a modified arm construction is shown in which the laterally extending portion 71' is provided with two curved fingers 72'.

Brackets 105 are secured to the top cross head 22 by bolts 2 and each is provided with a bearing for rotatably supporting the shaft 63. A bracket 107 positioned between the brackets 105 is secured upon the top cross head 22 by bolts 3 and is provided with bearing surfaces 109 (see Fig. 11) adapted to engage the spacer rings 69 between the arms 65 to prevent flexing of the shaft 63. The bracket 107 is provided with slots 110 for the passage of the arms 65.

Figure 16:
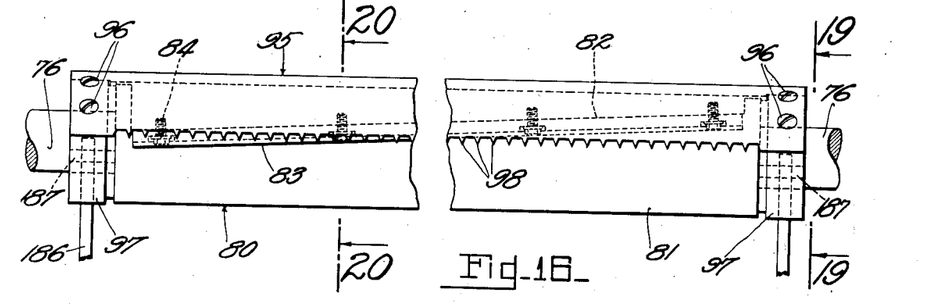
Fig. 16 is a fragmentary front elevation of the guide, knife and associated parts.
Figure 17:
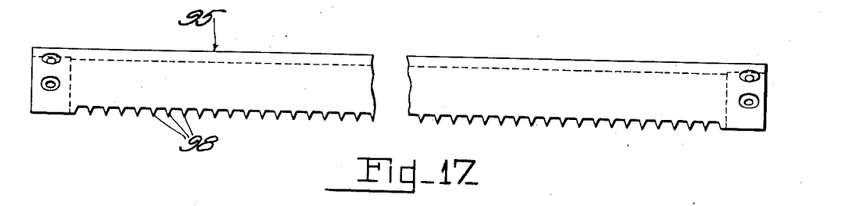
Fig. 17 is a detail view of the guide.
Figure 18:
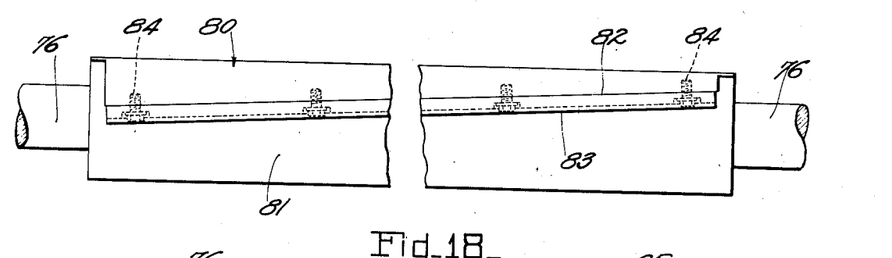
Fig. 18 is a detail view of the knife and the holder therefor.
Figure 19:
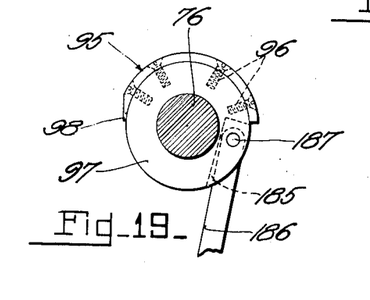
Figs. 19 and 20 are sectional views taken on the lines 19—19 and 20—20 of Fig. 16.
Figure 20:
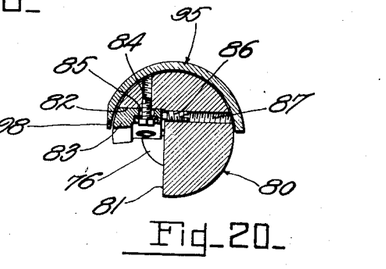

Alined stub shafts 75 are mounted for rotation in suitable bearings in the side frame members 20 and 21. A shaft 76 is alined with and operatively connected to the stub shafts 75 by collars 77 overlapping the ends of the shafts and keyed thereto in a manner similar to that described with reference to Fig. 11. The shaft 76 is provided with an enlargement comprising a knife holder 80 having a longitudinal slot 81, one face 82 of which is inclined to the axis of the shaft 76. A knife 83 is adjustably secured to the face 82 of the slot 81 by bolts 84 passing through slots 85 in the knife 83 and engaging the knife holder 80 (see Figs. 16, 18 and 20). A plurality of adjusting screws 86 engaging threaded holes 87 in the knife holder 80 are adapted to engage the inner edge of the knife 83 to adjust the position of its cutting edge. A stationary knife blade 90 is secured upon the lower cross head 23 by bolts 91 passing through elongated slots 92 in the blade 90 and engaging the cross head 23. The position of the blade 90 is adjusted by adjusting screws 93 engaging the blade 90 and threaded in a lug 94 projecting from the cross head 23 (see Figs. 4–8). The operative cutting edge of the knife 83 is spiral shaped so as to cooperate with the blade 90 to exert a shearing action upon the work.

An elongated arc-shaped guide 95 extends over the knife holder 80 and is secured at its ends by screws 96 to collars 97 rotatably mounted upon the shaft 76 adjacent the ends of the knife holder 80. The front edge of the guide 95 is provided with teeth 98. Brackets 100 are secured to the lower cross head 23 by bolts 101 and each is provided with a bearing for rotatably supporting the shaft 76. A bracket 102 positioned between the brackets 100 is secured upon the lower cross head by bolts 103 and is provided with a bearing 104 (see Fig. 4) adapted to engage the guide 95 to prevent flexing of the knife holder 80.

A motor 115 is suitably secured upon a bracket 116 fixed in the frame. A main drive shaft 117 is mounted for rotation in suitable bearings in the frame members 20 and 21. A pulley 118 carried by the armature shaft of the motor is connected by a belt 119 with a pulley 120 fixed upon the main drive shaft 117. A belt tightening arm 121 is pivotally mounted upon the frame member 25 and is provided at its free end with a roll 122 adapted to engage the belt 119. The roll 122 is held resiliently against the belt by a spring 123, one end of which is fixed to a stud 124 carried by the arm 121 and the other end of which is fixed to a stud 125 carried by the frame member 26. A cam shaft 127 is mounted for rotation in suitable bearings in the side frame members 20 and 21 and extends through the latter. A gear 128 loosely mounted upon the shaft 127 engages a gear 129 fixed upon the main drive shaft 117.

Figures 12, 13, 14:
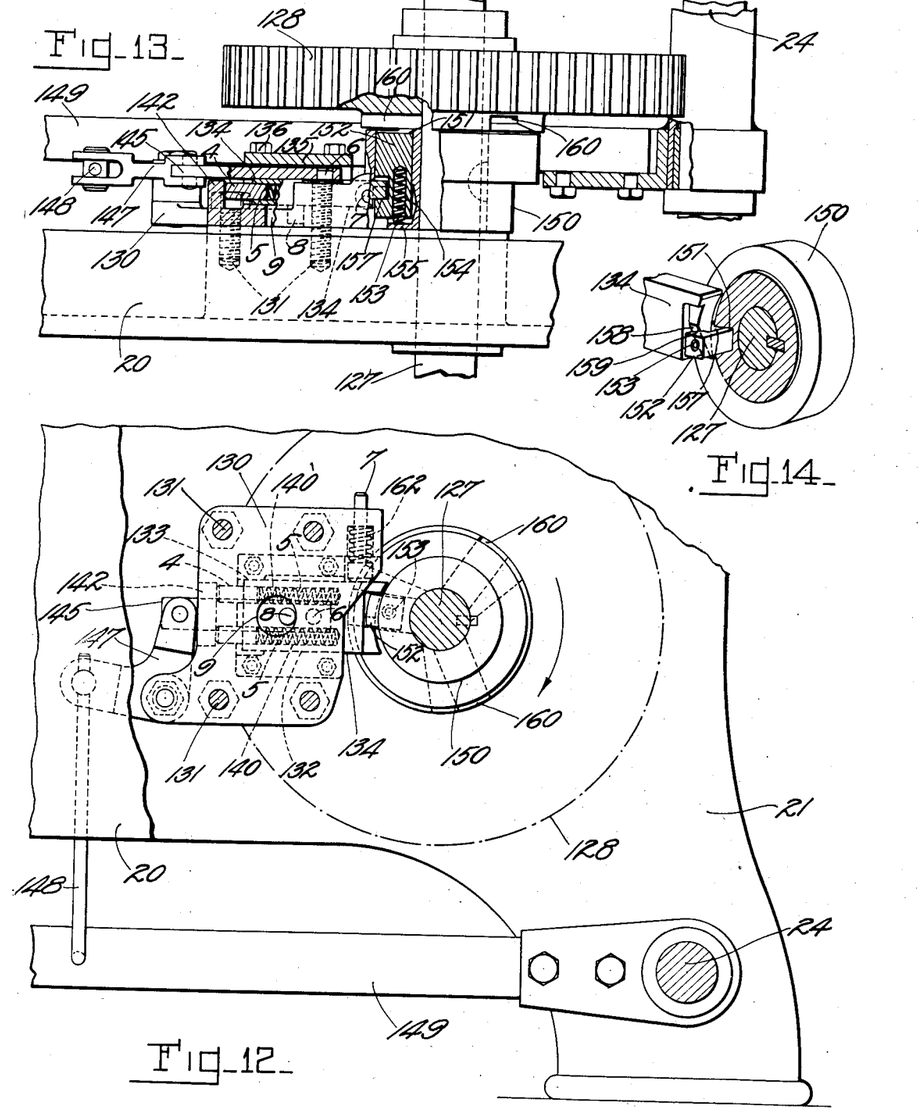
Fig. 12 is a fragmentary elevational view partly in section of another portion of the machine.
Fig. 13 is a plan view partly in section of the portion of the machine shown in Fig. 12.
Fig. 14 is a perspective view partly in section of certain parts shown in Figs. 12 and 13.

A bracket 130 is secured upon the side frame member 20 by bolts 131 and is provided with guideways 132 and 133 for guiding the movement of a slide 134 (see Figs. 12, 13 and 14). The guideway 133 is relatively short as compared with the guideway 132 to permit slight lateral movement of the slide 134. The slide 134 is held between the ways 132 and 133 by a cover 135 secured to the bracket 130 by bolts 136. A pin 8 extends from one surface of the slide 134 into an opening 9 in the bracket 130 to limit the movement of the slide toward the right as viewed in Fig. 13. The slide 134 is provided with recesses 140 in which plungers 4 are slidably mounted and urged resiliently against an abutment 142 on the bracket 130 by springs 5 extending between the bottom of the recesses 140 and the ends of the plungers 4. One end of a link 145 is pivotally connected to the slide 134 by a pin 6. The other end of the link 145 is pivotally connected to one arm of a bell crank 147 which is pivotally mounted upon the bracket 130. The other arm of the bell crank 147 is pivotally connected to one end of a rod 148, the other end of which is pivotally connected to a foot treadle 149 which is pivotally mounted upon the frame member 24.

A clutch element 150 is keyed upon the shaft 127 and is provided with a bore 151 in which a locking bolt 152 is slidably mounted and normally urged toward one face of the gear 128 by a spring 153 extending between a recess 154 in the bolt 152 and a shoulder 155 upon the clutch element 150. One end of the slide 134 is adapted to extend into a recess 157 in the bolt 152 and is provided with a cam surface 158. An inclined surface 159 is provided at the outer side of the recess 157 and is adapted to cooperate with the cam surface 158 in a manner described hereinafter. The face of the gear 128 adjacent the clutch element 150 is provided with a plurality of radial slots 160 adapted to receive the bolt 152 to lock the clutch element 150 and gear 128. A plunger 7 is slidably mounted in a guideway in the bracket 130 and is urged against the slide 134 by a spring 162 to resist lateral thrust of said slide.

Figure 15:
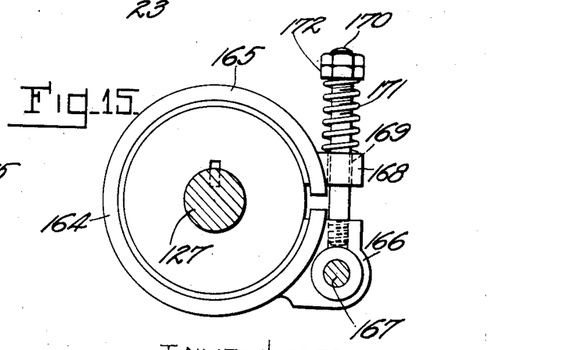
Fig. 15 is a sectional view taken on line 15—15 of Fig. 2.

One end of a brake shoe 165 (Figs. 2 and 15) is provided with a lug 166 pivotally mounted on a stud 167 fixed in the side frame member 21. The brake shoe 165 surrounds and engages a drum 164 fixed on the cam shaft 127 and is provided at its free end with a lug 168 having an opening 169 through which passes a bolt 170 threaded in the lug 166. A spring 171 surrounds the bolt 170 with one end engaging the lug 168 and its other end engaging a nut 172 threaded upon the free end of the bolt 170. The spring 171 is adapted to urge the brake shoe 165 against the drum 164 at all times and thus produce a drag upon the cam shaft 127 to stop its rotation except when positively driven.

A crank arm 175 is secured at each end of the shaft 45 and each is provided at its free end with forked arms in which a short shaft 177 is rotatably mounted. The upper ends of links 178 extend through the shafts 177 and are resiliently connected thereto by springs 179 surrounding the links 178 and extending between said shafts and nuts 181 threaded on the ends of said links. Cam rolls 182 are rotatably mounted on the lower ends of the links 178 and are adapted to engage cams 183 fixed in spaced relation upon the cam shaft 127.

Each of the collars 97 is provided with a slot 185 to receive one end of a link 186 which is pivotally mounted upon a pin 187 fixed in the collar and extending across the slot 185. The other end of each of the links 186 is pivotally connected to one end of one of the levers 188 which are pivotally mounted at an intermediate point upon lugs 189 depending from the lower cross head 23. Rollers 190 carried by the other ends of the levers 188 are held in engagement with the cams 191 fixed upon the cam shaft 127 by springs 192.

A gear 193 keyed upon the cam shaft 127 is adapted to mesh with a gear 194 keyed upon a shaft 195 extending through the side frame members 20 and 21 and mounted for rotation in suitable bearings in the latter. Preferably, the gear 193 is provided with twice the number of teeth provided on the gear 194 to cause the latter to rotate twice during each revolution of the former. Crank arms 196 fixed upon the outer ends of the stub shafts 62 are connected with crank arms 197 fixed upon the shaft 195 by links 198. Gears 199 keyed upon the outer ends of the stub shafts 75 mesh with gears 10 keyed upon the outer ends of the stub shafts 62.

Figure 4:
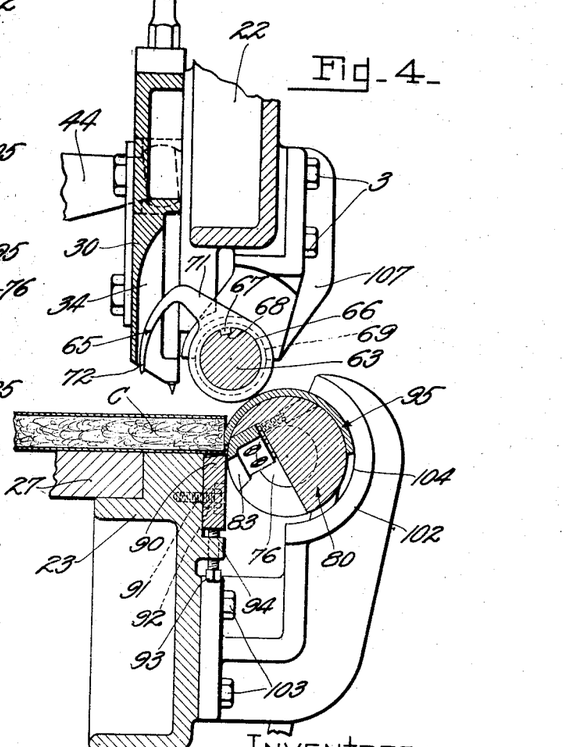
Figure 5:
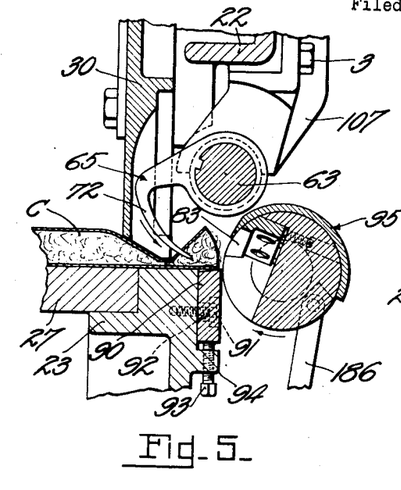
Figs. 5, 6, 7 and 8 are views similar to Fig. 4 showing successive steps in the cycle of operation in the machine.
Figure 6:
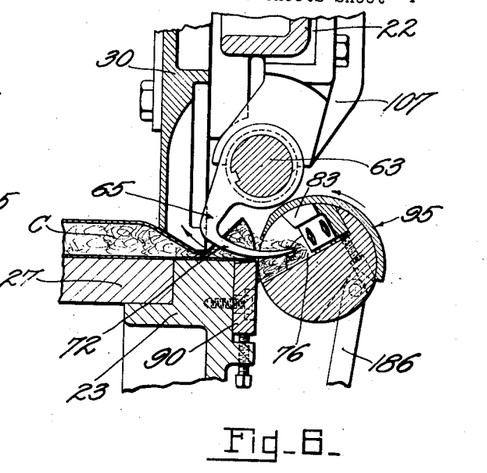
Figure 7:
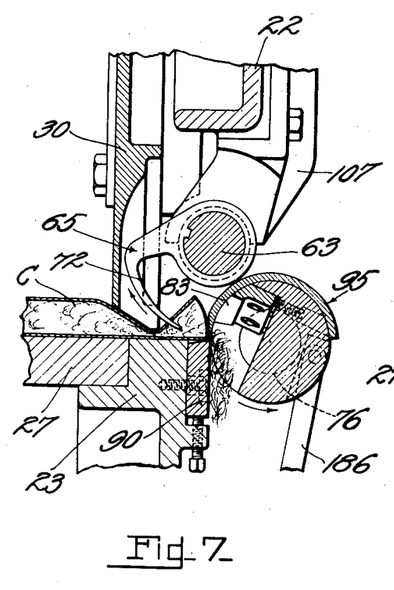
Figure 8:
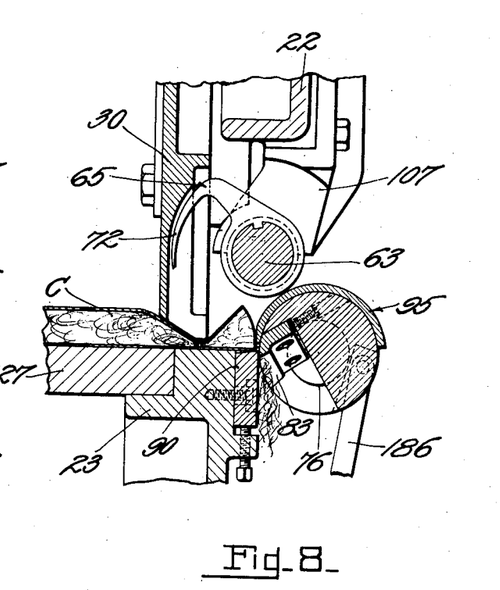
Figure 9:
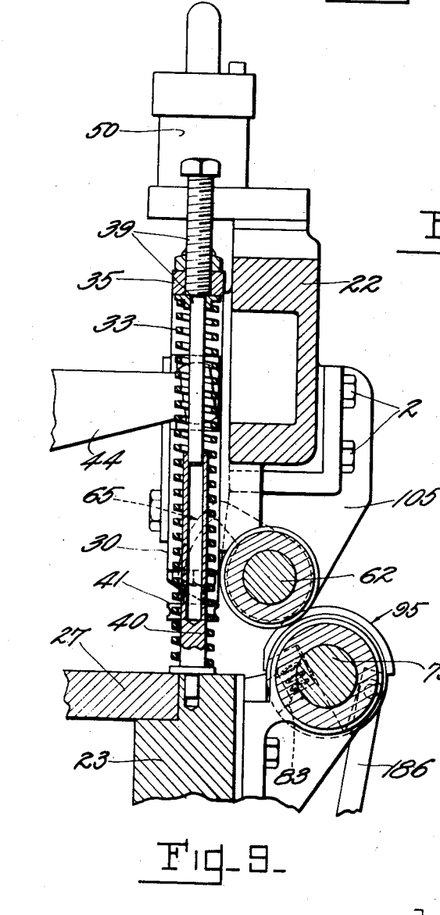
Fig. 9 is a sectional view taken upon the line 9—9 of Fig. 2.

The machine is so constructed as to complete one cycle of operations and automatically stop. When the machine is stopped the parts are in the positions shown in Fig. 4. The operator inserts the work along the table 27 until the edge of the upholstery engages the member 95 which positions the edge accurately with respect to the path of movement of the arms 65 and the knife 83. The motor 115 continuously rotates the main drive shaft 117 and the gear 128. When the edge of the upholstery has been positioned against the stop 95 as shown in Fig. 4, the operator steps upon the foot treadle 149 thus turning the bell crank 147 to move the slide 134 to the left, as viewed in Figs. 1, 12 and 13, to move the end of the slide out of engagement with the recess 157 in the bolt 152. This permits the spring 153 to move the bolt 152 toward the gear 128 and cause the bolt to engage one of the radial slots 160 in the gear thus operatively connecting the main drive shaft 117 and the cam shaft 127.

The operator immediately releases the foot treadle 149 thereby causing the springs 5 to return the slide 134 to its initial position. The cam shaft 127 continues to rotate through a complete revolution. At the end of the revolution of the cam shaft the inclined surface 159 on the bolt 152 engages the cam surface 158 on the slide 134 to cause the bolt to be drawn out of engagement with the radial slot 160 thus disconnecting the main drive shaft 117 and cam shaft 127. The brake shoe 165 which is continually resisting the rotation of the cam shaft brings the latter to a stop.

During the single revolution of the cam shaft, the cams 183 engage the cam rolls 182 to move the links 178 downward and thus rotate the shaft 45 and crank arms 44 in a clockwise direction as viewed in Fig. 1 to move the presser foot 30 into engagement with the upholstery along a line spaced from the edge of the latter and to compress and produce a cavity therein, as shown in Figs. 5 to 8 inclusive. The cams 191 then actuate the levers 188 to rotate the collars 97 upon the shaft 75 and move the member 95 from the position shown in Fig. 4 to that shown in Fig. 5. At the same time the intermeshing gears 193 and 194 rotate the shaft 195 and inasmuch as the shaft 195 is operatively connected with the shafts 62 through the crank arms 196 and 197 and the links 198, the shafts 62 and shaft 63 are caused to rotate. Inasmuch as the shafts 63 and 76 are operatively connected by the gears 10 and 199, these shafts are oscillated in opposite directions. Thus, the arms 65 carried by the shaft 63 are moved in the direction of the arrow in Fig. 5, causing the fingers 72 to pierce one of the upholstery fabrics and to engage a part of the stuffing between the fabrics and push the same beyond the edge of the upholstery, as viewed in Fig. 6. At the same time the knife 83 carried by the shaft 76 is moved in the direction of the arrow in Fig. 5. The arms 65 and knife 83 are then caused to move in the opposite direction as indicated by the arrows in Fig. 6 and at the same time the member 95 moves towards its initial position in the direction indicated by the arrow in Fig. 7, until these parts reach the positions shown in Fig. 8, whereupon the knife 83 cooperates with the blade 90 to sever the portion of the stuffing pushed beyond the edge of the cushion. The member 95 moves slightly in advance of the knife 83 and the teeth 98 thereon move into the spaces between the arms 65 and serve to strip the removed stuffing from the latter. When the member 95 reaches its initial position it holds the removed stuffing while the knife severs the same. This operation of the arms 65, knife 83, and member 95 is again repeated inasmuch as the ratio of the gears 193 and 194 is two to one. By this time the cam rollers 182 carried at the lower ends of the links 178 have reached the depressions in the cams 183 thereby permitting the springs 33 to raise the presser foot 30 out of engagement with the upholstery cushion. At this time the cam shaft 127 has just completed its single revolution and the inclined surface 159 on the bolt 152 engages the cam surface 158 on the slide 134 to cause the bolt to be released from the radial slot 160 and thus disconnect the source of power from the cam shaft.

We claim:

1. The method of thinning down the edge of upholstery having stuffing interposed between lining and finish fabrics which comprises piercing one of the fabrics upon a line spaced from the edge of the cushion and pushing part of the stuffing between said line and the edge of the cushion beyond said edge while preventing displacement of the stuffing in back of said line, and cutting said part of the stuffing at the edge of the cushion.

2. The method of thinning down the edge of upholstery having stuffing interposed between lining and finish fabrics which comprises piercing one of the fabrics upon a line spaced from the edge of the cushion, compressing the cushion to prevent displacement of the stuffing in back of said line, pushing part of the stuffing between said line and the edge of the cushion beyond said edge while preventing displacement of the stuffing in back of said line, and cutting said part of the stuffing at the edge of the cushion.

3. In a machine for thinning down the edges of upholstery cushions having stuffing interposed between lining and finish fabrics, means for removing a part of the stuffing from the edge of the cushion including a curved finger movable about its axis of curvature to pierce one of said fabrics upon a line in back of the edge thereof and push a part of the stuffing out beyond the edges of said fabrics.

4. In a machine for thinning down the edges of upholstery cushions having stuffing interposed between lining and finish fabrics, means for removing a part of the stuffing from the edge of the cushion including members movable to pierce one of said fabrics upon a line in back of the edge thereof and push part of the stuffing out beyond the edges of said fabrics, and a presser foot for preventing removal of the stuffing from the portions of the cushion in back of said line and having slots through which said members operate.

5. In a machine for thinning down the edges of upholstery cushions having stuffing interposed between lining and finish fabrics, a member movable to pierce one of said fabrics upon a line in back of the edge thereof and push part of the stuffing out beyond the edges of said fabrics, means for preventing removal of the stuffing from the portions of the cushion in back of said line, and means for severing the portion of the stuffing pushed beyond the edge of the cushion.

6. In combination, a table for supporting work, a reciprocable member adapted to push a portion of the work beyond the edge of the work, a knife adapted to sever said portion at the edge of the work, and mechanism for reciprocating said member and moving said knife to cause the latter to sever said portion at the edge of the work while the former is moving away from said edge.

7. In combination, a table for supporting work, means for positioning the edge of the work including a reciprocable guide, a reciprocable member adapted to push a portion of the work beyond the edge of the work, a movable knife adapted to sever said portion at the edge of the work, and means for moving said member, guide and knife to cause said member to move toward the work while the guide and knife are moving away from said edge.

8. In combination, a table for supporting work, a reciprocable presser foot adapted to engage the work upon a line spaced from the edge thereof, a reciprocable member adapted to engage the work between said line and its edge and push a portion of the work beyond said edge, a movable knife adapted to sever said portion at the edge of the work, and means for moving said member, knife and presser foot to cause said member to move toward the work while said knife is moving away from said edge and to cause said presser foot to move in engagement with the work before said member and knife engage the same and move out of engagement with the work after said member and knife have engaged the work.

9. In combination, a table for supporting work, means for positioning the edge of the work including a reciprocable guide, a reciprocable member adapted to push a portion of the work beyond the edge of the work, a movable knife adapted to sever said portion at the edge of the work, and means for moving said member, guide and knife to cause said member to move toward the work while the guide and knife are moving away from said edge, said guide having teeth adapted to engage said portion of the work substantially at the edge thereof to hold the same while being cut.

10. In combination, a table for supporting work, a reciprocable presser foot adapted to engage the work upon a line spaced from the edge thereof, a reciprocable member adapted to engage the work between said line and its edge and push a portion of the work beyond said edge, a movable knife adapted to sever said portion at the edge of the work, and means for moving said member, knife and presser foot to cause said member to move toward the work while said knife is moving away from said edge and to cause said presser foot to move in engagement with the work before said member and knife engage the same and move out of engagement with the work after said member and knife have engaged the work, said presser foot having teeth adapted to engage the work substantially upon said line.

11. In combination, a table for supporting work, means for positioning the edge of the work including a reciprocable guide, a reciprocable presser foot adapted to engage the work upon a line spaced from the edge thereof, a reciprocable member adapted to engage the work between said line and its edge and push a portion of the work beyond said edge, a movable knife adapted to sever said portion at the edge of the work, and means for moving said member, knife, presser foot and guide to cause said member to move toward the edge of the work while the knife and guide are moving away from said edge and to cause said presser foot to engage the work at the beginning of operations and move out of engagement at the end of operations.

12. In combination, a table for supporting work, a reciprocable member adapted to push a portion of the work beyond the edge of the work, a movable knife adapted to sever said portion at the edge of the work, mechanism for moving said member and knife to cause one to move toward the edge of the work while the other is moving away from said edge, and means for stopping said mechanism automatically after said knife has severed said portion and said member has moved out of engagement with the work.

13. In combination, a table for supporting work, a reciprocable hook shaped arm adapted to pierce the work and push a portion of the same beyond the edge thereof, a movable knife adapted to sever said portion, and actuating mechanism for said arm and knife to cause the arm to move in engagement with the work as the knife is moving away from the edge of the work.

14. In combination, a table for supporting work, means for compressing the work along a line spaced from its edge to form a cavity therein, a reciprocable hook shaped arm adapted to pierce the side of the cavity and push a portion of the work beyond the edge of the work, a movable knife adapted to sever said portion, and actuating mechanism for said arm and knife to cause the arm to move in engagement with the work as the knife is moving away from the edge of the work.

15. In a machine for thinning down the edges of upholstery cushions having stuffing interposed between lining and finish fabrics, in combination, means for holding and compressing the cushion along a line spaced from the edge, means for withdrawing a portion of the stuffing between said line and edge, and means for cutting off the stuffing so withdrawn.

16. In a machine for thinning down the edges of upholstery cushions having stuffing interposed between lining and finish fabrics, in combination, means for holding the cushion along a line spaced from the edge, means for removing a portion of the stuffing between said line and edge, and means for operating said instrumentalities to cause said removing means to operate a plurality of times while said cushion is held by said holding means.

17. In a machine for thinning down the edges of upholstery cushions having stuffing interposed between lining and finish fabrics, in combination, means for holding and compressing the cushion along a line spaced from the edge, means for withdrawing a portion of the stuffing between said line and edge, means for cutting off the stuffing so withdrawn, and means operable to position the cushion initially and to hold the removed stuffing while being cut off.

18. In a machine for thinning down the edges of upholstery cushions having stuffing interposed between lining and finish fabrics, in combination, means for holding the cushion along a line spaced from the edge, means for removing a portion of the stuffing between said line and edge, means for cutting off the stuffing so removed, means operable to position the cushion initially and to hold the removed stuffing while being cut off, and means for operating said instrumentalities to cause said removing means to operate a plurality of times while said cushion is held by said holding means.

FREDERICK N. ROSS.
HORACE L. JOHNSON.